(12) United States Patent
Plestid et al.

(10) Patent No.: US 6,553,230 B1
(45) Date of Patent: Apr. 22, 2003

(54) METHOD AND APPARATUS FOR PERFORMING SOFT HANDOFF BETWEEN CELLS OF LARGE DIFFERING RADII

(75) Inventors: Trevor T. Plestid, Ottawa (CA); Azeem Ahmad, Plano, TX (US); Michael S. Crowe, Sachse, TX (US); Sarvesh R. Sharma, Plano, TX (US); Shahid R. Chaudry, Nepean (CA); Neil McGowan, Stittsville (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/292,662

(22) Filed: Apr. 16, 1999

(51) Int. Cl.[7] .................................................. H04Q 7/20
(52) U.S. Cl. ........................ 455/436; 455/437; 370/331; 370/335
(58) Field of Search ................................. 455/432, 436, 455/437, 442, 446; 370/335, 331; 375/130

(56) References Cited

U.S. PATENT DOCUMENTS

| | | | | |
|---|---|---|---|---|
| 5,208,847 A | * | 5/1993 | Allen | 455/448 |
| 5,345,467 A | * | 9/1994 | Lomp et al. | 370/331 |
| 5,544,155 A | * | 8/1996 | Lucas et al. | 370/342 |
| 5,680,395 A | | 10/1997 | Weaver, Jr. et al. | 370/331 |
| 5,828,659 A | | 10/1998 | Teder et al. | 370/328 |
| 5,907,577 A | * | 5/1999 | Hoole | 375/130 |
| 6,035,199 A | * | 3/2000 | Barnett | 455/448 |
| 6,049,564 A | * | 4/2000 | Chang | 375/130 |
| 6,151,311 A | * | 11/2000 | Wheatley, III et al. | 370/335 |

* cited by examiner

Primary Examiner—Nay Maung
Assistant Examiner—Lewis West

(57) ABSTRACT

A method for allowing a mobile station to find a code transmitted by a base station which has a propagation delay to the mobile station which is much larger or smaller than a propagation delay between the mobile station and a base station from which it derived a time reference is provided. In the context of IS-95, a PN offset is sent to the mobile station to identify which target base station pilot signals to search for. By sending a virtual PN offset which differs from the real PN offset, the mobile station can find the target base station signals where normally they would fall outside the mobile station's search window.

17 Claims, 4 Drawing Sheets

METHOD AND APPARATUS FOR PERFORMING SOFT HANDOFF BETWEEN CELLS OF LARGE DIFFERING RADII

FIELD OF THE INVENTION

The invention relates to a method and an apparatus for performing soft handoff between cells of large differing radii, and particularly for application in systems which, due to a search window size which limits searching capabilities, can only perform handoff between cells having similar cell sizes.

BACKGROUND OF THE INVENTION

CDMA (code division multiple access) communications systems are currently designed to accommodate a maximum cell size difference of about 55 km. For certain applications, such as in large service areas, it would be advantageous to be able to provision for larger cell size differences, and to be able to perform handoff between larger cells and much smaller cells.

Mobile stations search for base stations within a CDMA communications system by looking for an identification code, such as the IS-95 PN (pseudo-random number) short codes (in-phase code and quadrature code), transmitted by every base station, different sectors of different base stations sending the same short code with a different time shift, known as a PN offset, which provides a unique base station sector identifier. Mobile stations on power-up acquire their time reference from the first base station they make contact with. This time reference is delayed by the RF propagation delay between the base station and the mobile station, Before a soft handoff, a mobile station which has been informed by a serving base station of the different time shifts of the short code for target base stations knows at what time to look for the short code generated by these target base stations. The serving base station is a base station with which the mobile station has an active communications channel. The mobile station's time reference is set according to the earliest path received from the serving base station(s). Potential target base stations are candidates for handoff which are identified, for example, on the basis of their proximity to the serving base station. The mobile station performs a search for the code over a time period known as the search window. This search window is placed according to the mobile station's notion of time which is derived from the serving base station. After a change in serving base station, the mobile station's search window slowly migrates so as to be centred about a time reference derived from the new base station. A problem with existing systems is that if a handoff is to be performed between two cells of large differing radii, then there is a big difference in delay between firstly, (the propagation delay between the mobile station and the target base station) and secondly (the propagation delay between the mobile station and the base station from which the mobile station has previously established a time reference) and this causes the short code of the target base station to arrive earlier or later than expected because, as indicated above, the time reference of the mobile station is derived from a different base station. If the difference in delay is sufficiently large, then the short code of the target base station will arrive outside the search window, the mobile station will fail to identify the short code, and the mobile station will by unable to perform soft handoff to the target base station.

One solution which has been proposed is to modify the mobile station such that it has a large enough search window or a search window offset so that it can find the short code regardless of the difference in delay. Problems with this are that every mobile station must be changed so as to not follow the CDMA IS-95 standard, and also that a larger search window takes a longer time to search.

It would be advantageous to be able to use existing mobile stations in environments with cells having large differing radii for interoperability reasons.

SUMMARY OF THE INVENTION

It is an object of the invention to obviate or mitigate one or more of the above identified disadvantages.

The invention is for application in a system in which base stations each transmit a known identification code, for example a CDMA short PN code with a respective PN offset. A method is provided for allowing a mobile station to search for and find the identification code of a target base station transmitting with a particular offset and having a cell size with a large cell size difference compared to that of a serving base station, and having a large propagation delay difference between the target base station and the serving base station, without making any changes to how the mobile station operates. The method involves providing information to the mobile station which makes it look for the identification code with a different offset than the particular offset.

Preferably, the different offset is selected to have a difference from the particular offset which compensates for a difference between firstly, (the propagation delay between the mobile station and the target base station) and secondly (the propagation delay between the mobile station and the base station from which the mobile station previously established a time reference).

In the event that the identification code is a CDMA short PN code, and the respective offset is a PN offset, the information provided to the mobile station consists of a virtual PN offset for the particular target base station which is different from the target base station's actual PN offset.

Even more generally, the invention provides a method of compensating for a large difference in propagation delay between a first signal sent with a first propagation delay and a second signal sent with a second propagation delay comprising sending information which makes a receiver search for the second signal at a time which is substantially equal to the second signal shifted by the large difference in propagation delay, within plus or minus half a search window size.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
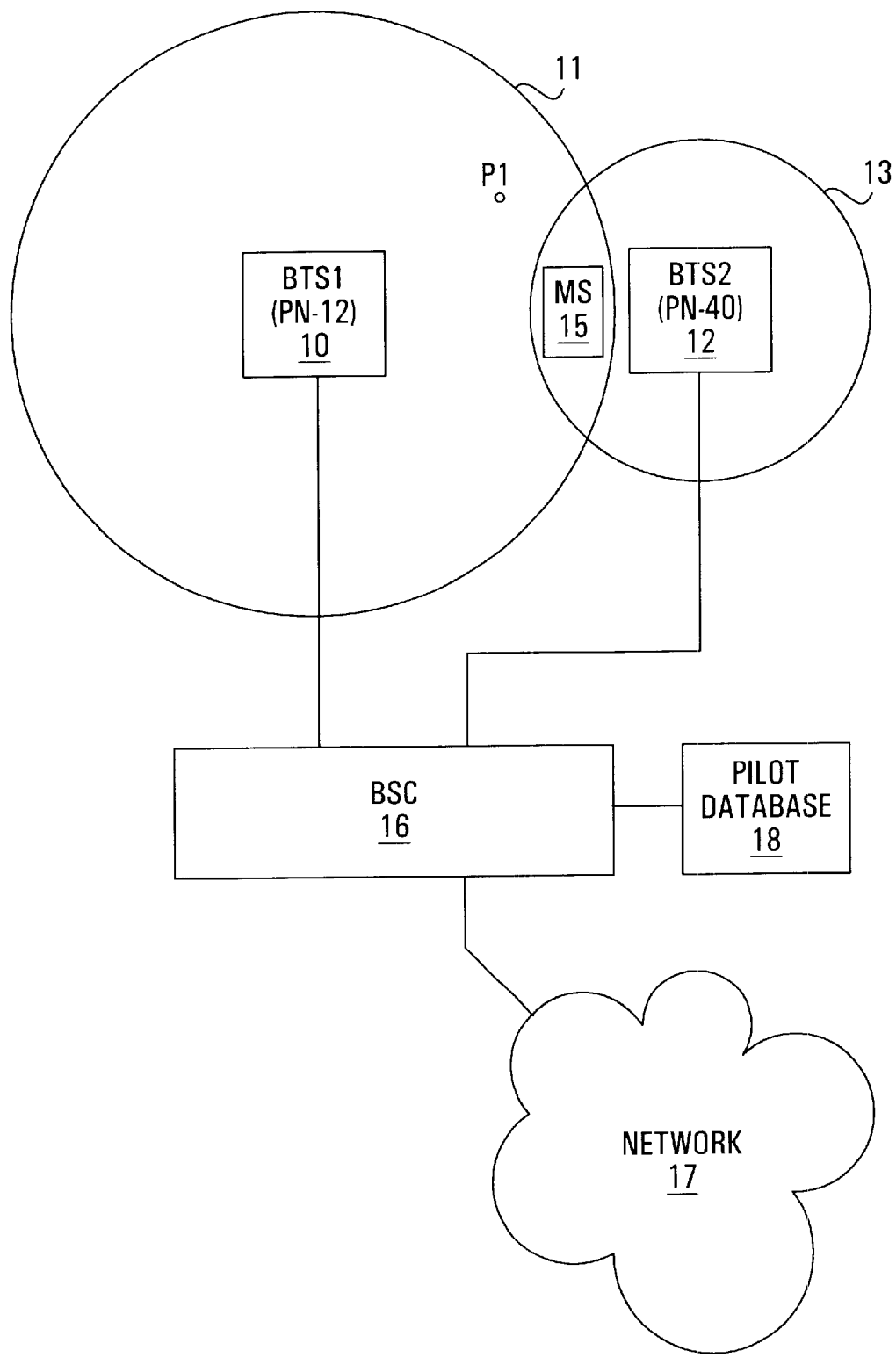
FIG. 1 is an example deployment scenario.

The problem to be overcome by an embodiment of the invention will be described in the context of a particular deployment scenario which is illustrated in FIG. 1. There are two base stations, BTS1 10, and BTS2 12 providing service to respective cells 11 and 13, the cell size for BTS1 10 being much larger than that of BTS2 12. The base stations are both connected to a control node, such as a BSC (base station controller) 16 which is connected to the rest of a network 17. The BSC 16 has access to a pilot database 18. Also shown is a MS (mobile station) 15 in a position where the cells 11,13 of BTS1 10 and BTS2 12 overlap, but which is to be understood as being in motion.

In CDMA, every base station transmits using a PN code which is the same except for the fact that different base stations transmit the PN code offset by a different amount. The PN code, or a deterministic "short code" repeats every 26.6 ms and has a length of $2^{15}$ chips. For IS-95, the chip rate is 1.2288 MHz, each chip is approximately 0.8 $\mu$s in duration, and the "chip distance" is approximately 244 meters, this being the distance light travels during a chip's duration. 512 different PN code shifts or offsets have been defined, each PN code shift shifted by an additional 64 chips with respect to the previous. A PN code having a PN offset of 0 consists of the PN code without any shift. More generally, a PN code having a PN offset of k, referred to hereinafter as "PN-k" where k=0 to 511, identifies the PN code shifted by 64 multiplied by k chips. One of these shifted PN codes is transmitted by each base station (by each sector if sectorized) with respect to a time reference which is uniform for all base stations and referred to as UTC (Universale Temps Coordonné, Universal Coordinated Time) time. This time reference is obtained by each base station from a global positioning system for example. The shift of the PN code transmitted by a given base station can be used to identify the particular base station. Each base station transmits a Sync channel which is aligned with the PN code, and which identifies the PN offset.

For the example of FIG. 1, it is assumed that BTS1 10 transmits with PN-12, and that BTS2 12 transmits with PN-40, both with respect to UTC.

Figure 2:
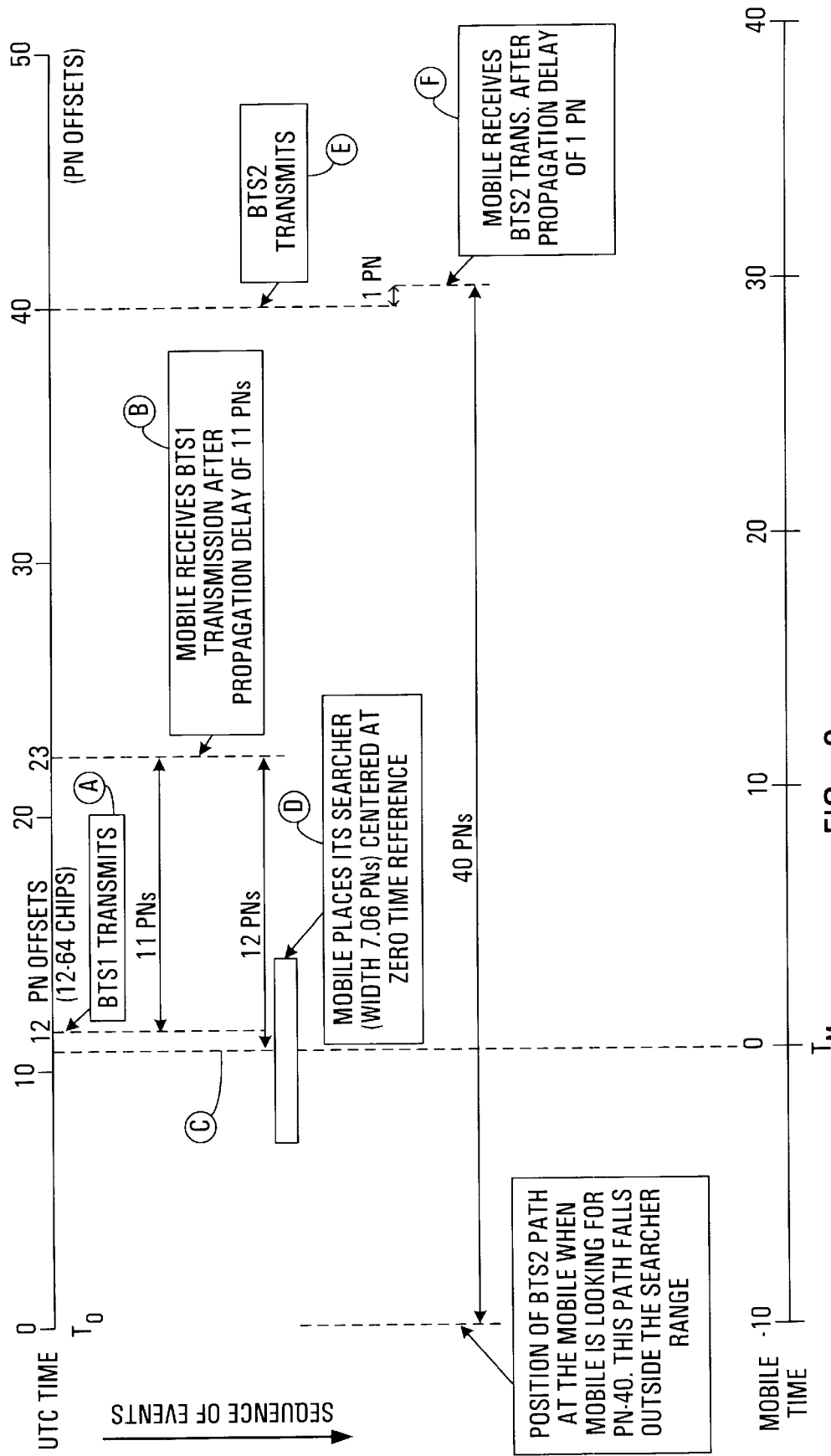
FIG. 2 is a timing diagram for a conventional approach to searching taken in the deployment scenario of FIG. 1.

A timing diagram for this example is shown in FIG. 2. In the diagram, an axis across the top labelled "UTC time" is the common standard time reference used by all of the base stations, measured in PN offsets from some time particular zero time reference $T_0$ in UTC time. All base stations have the same zero time reference $T_0$. $T_0$ for our purpose is any time at which a base station having PN-0 starts transmitting the PN code from its beginning. A sequence of events progresses from the top of the diagram to the bottom of the diagram. Each of these events will be described in detail below. Time as measured by the MS is on the axis across the bottom of the diagram labelled "Mobile Time", also measured in PN offsets from the MS's zero time reference $T_M$.

When the MS 15 is initially powered, for example at some point P1 within cell 11 of BTS1 10, it has an arbitrary time reference which is unrelated to UTC. In a conventional process referred to as "pilot channel acquisition", the MS searches for and eventually finds the PN code of a base station, in this case BTS1 10, but it does not know which base station transmitted the code because it has an arbitrary time reference and thus cannot know the shift of the PN code. In the timing diagram of FIG. 2, the beginning of the transmission of the PN code by the BTS1 10 is indicated at step A which occurs at $T_0$+12 PN. It is to be understood that while the BTS1 10 continuously transmits the PN code with an offset of 12 PN, step A represents the beginning of the transmission of one instance of a PN-12 code by BTS1 10. Although not shown, BTS1 10 also begins the transmission of a PN-12 code at times every 512 PN (26.6 ms) before and after $T_0$+12 PN. The MS 15 receives the transmission represented by step A after a propagation delay which is a function of the distance between the MS 15 and the particular base station, in this case BTS1 10. The one way propagation delay may be measured in PN offsets, or simply "PN" each PN being 64*0.8 $\mu$s=51.2 $\mu$s, or equivalently 15.6 km. In the illustrated example it is assumed that the MS 15 receives the start of the transmission after a propagation delay of 11 PN at step B. This means that the MS 15 is a distance of 11×15.6=172 km from BTS1 10. In UTC time this occurs at $T_0$+23 PN.

Next, the MS 15 looks for the Sync channel which is aligned with the PN pilot channel. The Sync channel defines an actual time reference and also states the particular base station's PN offset. In this case, the Sync channel identifies that BTS1 10 has PN-12. The MS 15 receives the PN offset information and the time reference information in this case after the above-referenced 11 PN propagation delay. The MS thus establishes its time reference at (Time of transmission= UTC+12 PN)+(propagation delay=11 PN)−PN offset of 12 PN)=UTC+11 PN, this being simply equal to the time reference used at BTS1 10 delayed by the propagation delay of 11 PN. The establishment of the time reference for the MS 15 is indicated at step C. The zero time reference for the MS, $T_M$, will be equal to $T_0$+11 PN.

It is well known that when a MS moves away from the coverage area of one or more base stations into the coverage area of another base station or base stations, a handoff must be performed. For our example, the MS 15 might move away from the coverage area of BTS1 10 into the coverage area of BTS2 12. The first step in a handoff is for a serving base station to provide the MS with a list of neighbouring base stations. Neighbouring base stations are identified by their PN offsets in a neighbour list message sent to the MS over a paging channel for example. The MS, during a call, monitors the pilot channel strength of signals received from base stations thus identified, and when a pilot channel strength exceeds a threshold $T_{add}$, that base station is added to the active set, the active set defining the set of base stations which are to have active communication with the MS. Similarly, when a pilot channel strength falls below a threshold $T_{drop}$, that base station is removed from the active set. In this manner, base stations are added and removed from the active set during the initiation, and subsequent completion of a soft handoff. This is just one of many different ways by which a handoff can be performed involving base stations which have been identified by the MS.

In order to monitor the signal strength of a pilot channel, the MS must first search for and locate the pilot channel. To begin, the MS identifies the PN code to be searched for by taking into account the known PN offset of the base station (as identified in the neighbour list message, identifying potential target base stations) with the assumption that a PN-0 code starts at the MS zero time reference $T_M$ and every 26.6 ms before and after this time. The MS then performs a correlation of the PN code thus identified with signals received. Since the target base station might be either closer or farther than the base station from which the MS has derived its time reference, the PN code might arrive earlier or later than expected. If the target base station is farther away, the PN code will arrive later than expected, and if the target base station is closer, the PN code will arrive earlier. To deal with this, the MS searches for the code during an interval of time before and after its own zero time reference, this interval being referred to as the search window. Current MSs have search windows which are set up to look for transmissions from base stations which arrive up to 3.53 PN earlier than expected, and up to 3.53 PN later than expected. This translates into the ability to find the transmissions of base stations which are closer, or farther by a maximum of about 55 km. This presents a problem for developing large cells next to small cells such as might be the case when developing cell sites in situations which need to have large cell sizes.

Referring back to the example, the MS placing its searcher about its own zero time reference $T_M$ is indicated at step D. It is assumed that the MS is moving from the very large cell 11 of BTS1 10 from which there is an 11 PN propagation delay, to the relatively small cell 13 of BTS2 12 having PN-40 from which there is a one PN delay, and is currently at a point where it is in the coverage area of both BTS1 10 and BTS2 12. The transmission of the PN-40 by BTS2 12 is indicated at step E. The MS receives PN-40 after a propagation delay of one PN at step F. The MS, knowing the target base station to have PN-40 via the neighbour list message, places its searcher at PN-40 with respect to its own time reference. This is equivalent to subtracting 40 PN at step G or referring all base station signals to "$T_M$". This is equivalent to shifting the search window previously established at step D about its own time reference by 40 PN. In this case, since the new base station is 10 PNs closer to the MS 15 in RF propagation terms, the MS 15 time reference with respect to the BTS2 12 will be 10 PN later than it was with respect to the BTS1 10 and the BTS2 12 transmission will arrive 10 PN earlier than expected by the MS. However, the MS only searches for signals which are up to 3.53 PN early or 3.53 PN late, and as such the MS 15 will fail to find the transmission of BTS2 12.

According to the invention, a solution to this problem is provided which requires no change whatsoever at the MS. Rather than sending only the actual PN offset of the base station of a cell of large differing radius in the message(s) identifying neighbours, a virtual PN offset is also sent, the virtual PN being selected to compensate for the difference in delay such that the MS will find the target base station's signal in its conventional search window. In the above identified example, if a virtual PN of PN-32 is used for BTS2 12, the MS 15 will look for a code which is offset by 8 PN less than it actually is. This is equivalent to looking for the PN-40 code 8 PN earlier than normal. Since the MS's time reference of $T_M=T_0+11$ PN is used as the centre of the search window, the MS will look for a PN-32 code which it, receives beginning any time between $T_M$–window size/2, $T_M$+window size/2=$(T_0+11$ PN$)-3.53$ PN, $(T_0+11$ PN$)+3.53$ PN.

Figure 3:
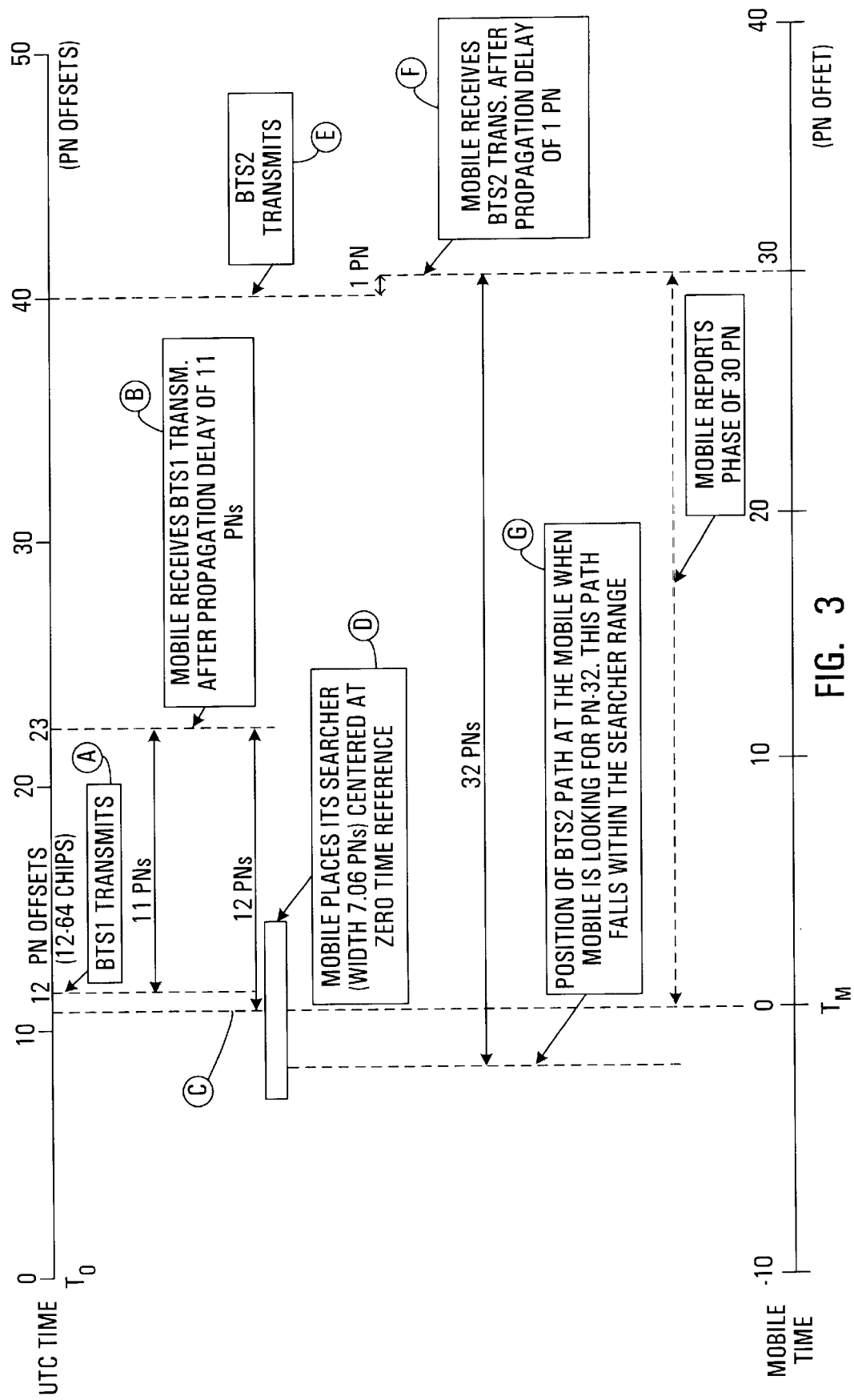
FIG. 3 is a timing diagram in which an embodiment of the invention results in different searching for the deployment scenario of FIG. 1.

A timing diagram for this example is provided in FIG. 3. For this example, step E is the beginning of the PN code as transmitted by the BTS2 12. The MS 15 receives this at step F after a propagation delay of one PN. The MS shifts by 32 PN to convert it to a zero-PN code at step G. The PN-32 code will be found because it will arrive at the MS at (time of transmission=$T_0+40$ PN)+(propagation delay=1 PN)–(virtual offset=32 PN)=$T_0+9$ PN. Recalling the MS's time reference $T_M=T_0+11$ PN, the PN-32 code will be detected at $T_M-2$ PN which is inside the search window identified above.

The above description and specific example has provided a method and system by which a MS can search for and locate a BTS transmission, in a large differing cell size scenario, without requiring any modifications to the MS per se. The example has focused on the IS-95 implementation in which a common PN code is transmitted by all BTSs. More generally, this solution can be applied whenever a transmission identifies a transmitter on the basis of some delay in the transmission which is unknown at a receiver. By telling a MS to expect a different delay than normal, a large difference in propagation delay between the MS and different transmitters can be compensated for.

Depending upon a particular implementation, the above described method requires several other changes to be made in the mobile communications system. These will be described here for the IS-95 implementation by way of example.

Pilot Database

Whatever system entities are responsible for associating PN offsets with BTSs will need to have room for both a real PN and a virtual PN for BTSs which might potentially be involved in a handoff requiring virtual PN. In the IS-95 example, preferably this additional information is stored in the Pilot Database. Preferably at most a single virtual PN is provided for any given base station. More generally, using a multiplicity of virtual PNs facilitates scenarios of multiple cells and sectors of varying sizes.

Preferably, the control node responsible for generating the contents of neighbour list messages has for each of a plurality of transmitters a respective first memory field for storing a respective real code identifier and for at least one of the plurality of transmitters a respective second memory field for storing a respective virtual code identifier. Preferably, the control node has a processing element for identifying the target base stations to be included in the neighbour list message, has an input for receiving an input for receiving a request to identify target base stations for the serving base station, and has an output for sending to the serving base station a message containing the real code identifiers of the target base stations and the virtual code identifiers of the target base stations, this message being the neighbour list message in the above examples.

Phase Reporting

The MS reports the signal strengths of pilots that it sees in a pilot strength measurement message. It associates a given pilot strength with the corresponding base station by sending a phase of the received PN sequence. The phase is identified as the virtual PN+position in search window, converted to chips. In the above example, the phase is (32–2 30) PN×64 chips/PN=1920 chips.

The control node then calculates the PN offset of the target BTS using the following expression where "$\lfloor\ \rfloor$" indicates rounding down:

PN Offset=$\lfloor$(phase+(½ # chips per PN)×PilotINC)/(# of Chips/PN×PilotINC)$\rfloor$×PilotINC Assuming a PilotINC of 4, the above equation yields for our example:

PN offset=$\lfloor(1920+32\times4)/(64\times4)\rfloor\times4=32$.

The control node computes the virtual PN from the information received from the MS, and looks up in the Pilot Database to determine which BTS should be instructed to setup a traffic link to the MS. In this case, the control node looks for PN 32 in the Pilot Database, and determines that it is a virtual PN for BTS2 and proceeds to ask BTS2 to setup a traffic link with the MS.

Setting up TCE in case of Virtual Mobile PN soft handoff

Whenever the virtual PN scheme described above is used to do a soft handoff, the frame transmission circuitry, for example the TCE (traffic channel element) in the target base station may need to be setup differently than a regular soft handoff. The TCE has no knowledge of the virtual Mobile PN scheme being used in the soft handoff. It checks the PN passed in the TCE connect message by the control node. If this PN is different than the PN that is actually transmitted in that sector then the TCE assumes that the virtual PN scheme is used and the PN passed by the control node is the virtual PN The following algorithms may be used to setup forward and reverse links at the TCE.

Setting up Forward Link in Case of Virtual Mobile PN–BTS Frame Transmission Timing The position of the frames that get transmitted by a BTS to a MS using a virtual PN for the BTS needs to be changed by the amount of difference between the virtual and real PN as the mobile is assuming that BTS2 transmission uses the virtual PN while in reality it uses the real PN. This will enable the MS to demodulate the forward link traffic.

Figure 4:
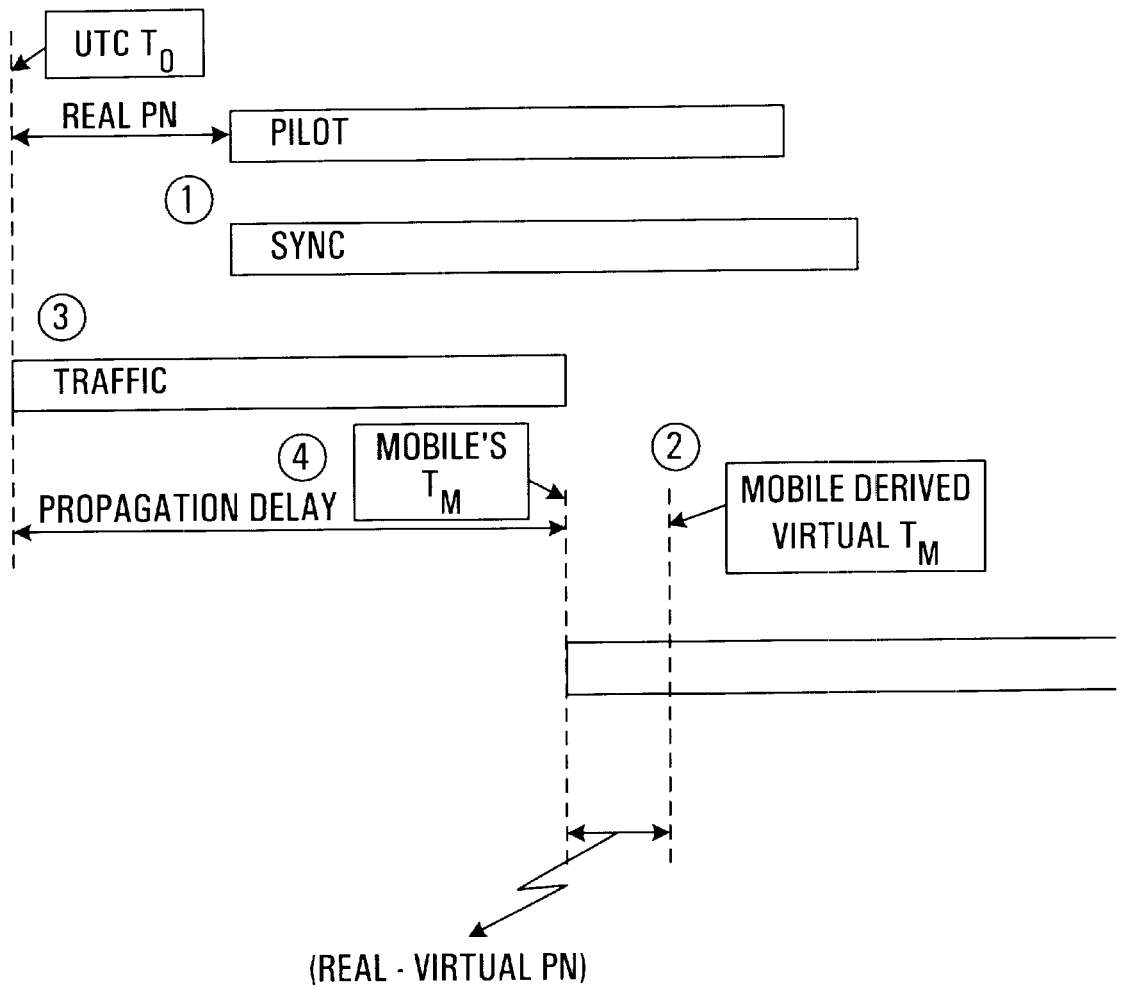
FIG. 4 is a timing diagram illustrating why forward link frames should be shifted in the target base station in support of soft handoff using virtual PNs.

In cases where the MS is using virtual PN to demodulate a BTS pilot signal, the MS's concept of reference time is skewed by the amount of difference between the real and virtual PN. The situation is illustrated in FIG. 4. The following four steps are highlighted in the figure:

1. The BTS transmits a pilot and Sync channel message starting at a distance of real PN offset from UTC time reference $T_0$.
2. In case of the virtual PN scheme the MS uses the virtual PN to demodulate the pilot signal. The MS's concept of the UTC will depend on the virtual PN rather than the real PN. In case of soft handoff the MS is already communicating with another BTS and it does not demodulate the Sync channel from this new BTS. In the figure, the "virtual $T_M$" indicates MS's effective $T_M$ derived by the MS assuming that the BTS was transmitting using virtual PN. Therefore, this boundary will be off from the MS's $T_M$ boundary by the difference between real and virtual PN. The figure represents the case when the virtual PN is smaller than the real PN.
3. If the forward link is not adjusted then the BTS will transmit a traffic frame in sync with the BTS time reference (for frame offset=0).
4. The traffic frame will arrive at the MS after a delay equal to the propagation delay. Over the air propagation delay will also represent the delay between BTS $T_0$ and MS's $T_M$ (if the MS was using real PN). Since the MS is assuming that the frame starts (real PN–virtual PN) later it will only demodulate garbage.

If the BTS delays the transmission of traffic frames by (real PN–virtual PN) then the MS will receive the traffic frames at the MS's virtual $T_M$ boundary and they will be demodulated correctly.

The Traffic Channel Element needs to implement the following algorithm to decide the position of forward traffic frames in case of a soft handoff request:

compare the PN received from the control node with the PN data filled for that sector i.e. real PN if the PN passed by the control node is same as the real PN, setup the TCE as done currently, or if the PN passed by the control node is different than the real PN, then assume it is virtual PN and calculate (real PN–virtual PN)

if (real PN–virtual PN) is positive then delay the transmission of forward traffic frames by this amount, or if (real PN–virtual PN) is negative then advance the transmission of forward traffic frames by this amount.

In case the MS goes into softer handoff after this soft handoff, no additional adjustment will be needed for forward traffic frames of any sector as long as the value of (real PN–virtual PN) is same for all sectors of the cell.

Setting up Reverse Link in Case of Virtual Mobile PN-Target Time-of-Arrival

The target base station expects to receive reverse traffic frames at a target time-of-arrival which is identified to the target base station by a control node. The target time-of-arrival sent by the control node to BTS2 will be off by the difference between the virtual PN and real PN. The target base station software will be required to calculate the actual target TOA using the PN sent by the control node. This will be needed to get the reverse link going. This is required to centre the searcher at the BTS.

The control node calculates the target time of arrival of the MS at the target BTS for soft handoff using the following formula:

target TOA at BTS2=RTD1 (in chips)+(phase of BTS2−(64×pilot PN)), where RTD1 is the Round Trip Delay of the MS as seen at BTS1 and "phase of BTS2" is the phase of BTS2 seen by the MS. When there is a situation as shown in FIG. 1;

phase of BTS2 reported by the MS=1920 chips;

the control node calculates the PN offset of the target cell using the following equation:

⌊(phase+32×PilotINC)/(64×PilotINC)⌋×PilotINC which, assuming a PilotINC of four is used evaluates to:

⌊(19+32×4)/(64×4)⌋×4−32;

the target TOA at BTS2=(11×64×2)+((1920−(64×32)))=1280 chips;

the actual TOA should have been TOA (real)=(11×64×2)+((1920−(64×40)))=768 chips;

therefore the target TOA given to BTS will be off by the amount of difference between real and virtual PN i.e. (40−32)×64 chips. The following algorithm can be used at the BTS to determine the correct TOA of the MS at the BTS:

if the PN passed by the control node is same as the real PN, then the target TOA passed by the control node is the correct TOA;

if the PN passed by the control node is different than the real PN, then assume it is virtual PN and calculate target TOA using correct TOA=target TOA from control node+(virtual PN–real PN).

Numerous modifications and variations of the present invention are possible in light of the above teachings. It is therefore to be understood that within the scope of the appended claims, the invention may be practised otherwise than as specifically described herein.

Preferably, when a virtual PN has been established in association with a real PN, both the virtual PN and the real PN are included in the neighbour list message. This; eliminates the requirement for a decision to be made as to which PN to include. Alternatively, a decision process can be executed to determine which PN to send.

The embodiments of the invention in which an exclusive property or privilege is claimed are defined as follows:

1. In a system in which transmitters each transmit a known identification code with a respective offset, a method comprising:

a particular transmitter transmitting the identification code of the particular transmitter with a particular offset;

providing information to a mobile station which makes it look for the identification code of the particular transmitter with a different offset than the particular offset.

2. A method according to claim 1 wherein the different offset is selected to have a difference from the particular offset which is selected to compensate for a difference between the propagation delay between the mobile station and the particular transmitter and the propagation delay between the mobile station and a node from which the mobile station has previously established a time reference.

3. A method according to claim 1 wherein the information provided to the mobile station comprises one or more messages identifying PN offsets of potential target transmitters.

4. A method according to claim 1 further comprising the particular transmitter sending frames offset in time by the difference between the different offset and the particular offset.

5. A method according to claim 4 further comprising preparing at the particular transmitter to receive communications from the mobile station at a different time than would otherwise be expected.

6. A method according to claim 5 wherein said step of preparing comprises calculating a revised target time-of-arrival.

7. A method of coordinating a handoff of a mobile station between a serving transmitter and a target transmitter in respective cells having large differing radii in a system in which transmitters each transmit a known identification code with a respective offset, in which mobile stations search for the identification code of a particular transmitter on,the basis of its particular offset, and in which a mobile station has a time reference which is based on a standard transmitter time reference plus a propagation delay between the serving transmitter and the mobile station, the method comprising:

identifying to the mobile station a virtual offset which differs from the target transmitter's actual offset which compensates for a difference between the propagation delay between the mobile station and the serving transmitter and a propagation delay between the mobile station and target transmitter.

8. A method of compensating for a large difference in propagation delay between a first signal sent with a first propagation delay and a second signal sent with a second propagation delay comprising sending information which makes a receiver search for the second signal at a time which is substantially equal to the second signal shifted by the large difference in propagation delay, within plus or minus half a mobile search window size.

9. A control node for participating in the control of a plurality of transmitters, the control node comprising:

for each of a plurality of transmitters a respective first memory field for storing a respective real code identifier and for at least one of the plurality of transmitters a respective second memory field for storing a respective virtual code identifier;

wherein for a particular transmitter, the virtual code identifier and the real code identifier differ in a manner which permits a mobile receiver to find a pilot transmission from the particular transmitter notwithstanding a large difference in propagation delay between (the mobile receiver and the particular transmitter) and (the mobile receiver and a transmitter from which the mobile receiver derived a time reference).

10. The control node of claim 9 wherein the real code identifiers identify a real offset of a code which is otherwise commonly transmitted by all the transmitters, and wherein the virtual code identifier identifies a virtual offset.

11. The control node of claim 9 wherein the difference between the virtual offset and the real offset is proportional to the difference in propagation delay between (the mobile receiver and the particular transmitter) and (the mobile receiver and a transmitter from which the mobile receiver derived a time reference).

12. A control node for participating in the control of a plurality of transmitters, the control node comprising:

for each of a plurality of transmitters a respective first memory field for storing a respective real code identifier and for at least one of the plurality of transmitters a respective second memory field for storing a respective virtual code identifier;

wherein for a particular transmitter, the virtual code identifier and the real code identifier differ in a manner which permits a mobile receiver to find a pilot transmission from the particular transmitter notwithstanding a large difference in propagation delay between (the mobile receiver and the particular transmitter) and (the mobile receiver and a transmitter from which the mobile receiver derived a time reference);

the control node for controlling transmitters which form part of base stations, including a serving base station, comprising:

an input for receiving a request to identify target base stations for the serving base station;

a processing element for identifying the target base stations;

an output for sending to the serving base station a message containing the real code identifiers of the target base stations and the virtual code identifiers of the target base stations.

13. The control node of claim 12 further comprising:

a further input for receiving a pilot strength of a particular target base station searched for and found by a mobile station identified according to a received code identifier which is either the particular target base station's virtual code identifier or the particular target base station's real code identifier;

wherein the processing element identifies the particular target base station on the basis of the received code identifier, and instructs the particular target base: station to set up a traffic channel with the mobile station.

14. The control node of claim 13 wherein the control node sends the received code identifier to the particular target base station when instructing the particular target base station to set up a traffic channel.

15. A mobile communications system comprising the control node of claim 12 in combination with the base stations.

16. A mobile communications system according to claim 15 wherein a base station which has been successfully identified on the basis of its virtual code identifier offsets its transmit frames by a time which is a function of the difference between the real code identifier and the virtual code identifier.

17. A mobile communications system according to claim 15 wherein a base station which has been successfully identified on the basis of its virtual code identifier offsets its expected time-of-arrival of incoming frames by a time which is a function of the difference between the real code identifier and the virtual code identifier.

* * * * *